United States Patent
Liu

(10) Patent No.: US 10,060,783 B2
(45) Date of Patent: Aug. 28, 2018

(54) SCALE ASSEMBLY WITH A BASE HAVING A RESTING SURFACE DEFINING A RECEIVING SLOT

(71) Applicant: Wistron Corporation, New Taipei (TW)

(72) Inventor: Wei-Lun Liu, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 138 days.

(21) Appl. No.: 15/099,622

(22) Filed: Apr. 15, 2016

(65) Prior Publication Data

US 2017/0234721 A1    Aug. 17, 2017

(30) Foreign Application Priority Data

Feb. 17, 2016  (TW) .............................. 105104665 A

(51) Int. Cl.
*G01G 19/52* (2006.01)

(52) U.S. Cl.
CPC .................................... *G01G 19/52* (2013.01)

(58) Field of Classification Search
CPC ..... G01G 19/52; G01G 23/002; G01G 23/005
See application file for complete search history.

(56) References Cited

U.S. PATENT DOCUMENTS

| | | | | |
|---|---|---|---|---|
| 4,726,435 A * | 2/1988 | Kitagawa | ............... | G01G 23/06 177/154 |
| 4,805,637 A * | 2/1989 | Walthert | ............... | A61B 5/1036 177/200 |
| 5,332,182 A * | 7/1994 | Weisz | ....................... | F16M 7/00 248/188.4 |
| 8,204,710 B2 * | 6/2012 | Walthert | ............ | G01G 23/3735 702/101 |
| 9,091,585 B2 * | 7/2015 | Turner | .................... | G01G 5/006 |
| 9,366,588 B2 * | 6/2016 | Lee | ........................... | G01L 1/26 |
| 2002/0124017 A1* | 9/2002 | Mault | .................... | A61B 5/222 600/300 |
| 2011/0242010 A1 | 10/2011 | Chang et al. | | |
| 2014/0020961 A1* | 1/2014 | Luo | ....................... | G01G 19/414 177/25.15 |
| 2014/0089231 A1* | 3/2014 | Jhunja | ..................... | G01G 7/06 705/407 |

FOREIGN PATENT DOCUMENTS

| | | |
|---|---|---|
| CN | 2456146 Y | 10/2001 |
| TW | 201134182 A | 10/2011 |

OTHER PUBLICATIONS

Office Action issued in corresponding Taiwan patent application dated Nov. 23, 2016 and its English translation.

* cited by examiner

*Primary Examiner* — Natalie Huls
(74) *Attorney, Agent, or Firm* — McClure, Qualey & Rodack, LLP

(57) ABSTRACT

The instant disclosure relates to a scale assembly applicable to a mobile device, which includes a touch screen and a software application (app). The scale assembly includes a platform, one or more sensing member, one or more flexible member, and a base. When an object is placed on the platform, the sensing member of the scale assembly presses the touch screen of the mobile device, and the mobile device, based on the app, reads the change associated with a sensing value detected by the touch screen, and converts the obtained sensing value difference into the weight of the object.

11 Claims, 6 Drawing Sheets

SCALE ASSEMBLY WITH A BASE HAVING A RESTING SURFACE DEFINING A RECEIVING SLOT

CROSS-REFERENCES TO RELATED APPLICATIONS

This non-provisional application claims priority under 35 U.S.C. § 119(a) on Patent Application No. 105104665 filed in Taiwan, R.O.C. on Feb. 17, 2016, the entire contents of which are hereby incorporated by reference.

BACKGROUND

Technical Field

The instant disclosure relates to a scale assembly, in particular to a scale assembly compatible with mobile devices.

Related Art

Electronic scales are widely used today, allowing users to quickly and accurately determine the weight of an object. Some mobile devices nowadays are furnished with software applications (apps), such that users can measure the weight of an object via mobile devices. However, if the measurements are not based on press-sensing touch screens, accurate measurements cannot be obtained. Even if press-sensing type touch screens are utilized, only a limited measuring range can be achieved.

SUMMARY

To address this issue, the instant disclosure provides a scale assembly of one embodiment, which is applicable to a mobile device. The mobile device has a touch screen and a software application (app). The scale assembly comprises a platform, at least one sensing member, at least one flexible member, and a base. The base has a resting surface and defines at least one receiving slot, where the receiving slot is defined at one side of the resting surface. The mobile device can be disposed on the resting surface. The platform has a supporting surface, a joining surface, and at least one mounting portion. The supporting surface and joining surface face opposite directions, with the supporting surface capable of carrying at least one object. The mounting portion is connected to respective sides of the supporting surface and joining surface and abutted to the flexible member. The sensing member is joined to the joining surface and abuts the touch screen. When weighing the object, the mobile device utilizes the app to read a change in a sensing value, with the change in the sensing value being detected by the touch screen, and converts the change in the sensing value into a weight value of the object.

The detailed description provided hereinbelow describes the technical features and advantages of the instant disclosure in details. The description allows a person skilled in the art to comprehend the technical content of the instant disclosure and put it into practice.

DETAILED DESCRIPTION

Figure 1:
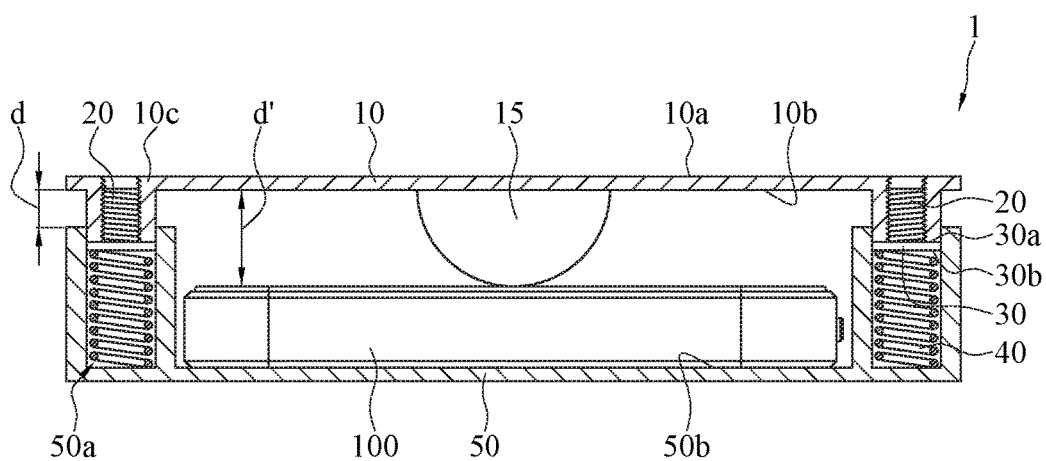
FIG. 1 is a sectional view showing a scale assembly for a first embodiment of the instant disclosure.

Please refer to FIG. 1, which shows a scale assembly 1 for a first embodiment of the instant disclosure. The scale assembly 1 may be used along with a mobile device 100 for measuring the weight of an object. The mobile device 100 may be a smartphone or tablet computers, such as a mobile phone running on Android or iOS operating system, but is not restricted thereto. The mobile device 100 has a touch screen and is furnished with a software application (app), which is used to calculate the weight of the object. This app may also be downloaded via wireless communication. The description hereinafter first describes the structural characteristics of the scale assembly 1, followed by discussing the mobile device 100 and app thereof and the weighing process.

For the instant embodiment, the scale assembly 1 comprises a platform 10, a sensing member 15, a pair of flexible members 40, and a base 50. The base 50 defines a pair of receiving slots 50a and a resting surface 50b. The receiving slots 50a accommodate the flexible members 40 with a one-to-one relationship. In other words, since the instant embodiment comprises two flexible members 40, therefore two receiving slots 50a are provided, where each flexible member 40 is accommodated by one receiving slot 50a. The receiving slots 50a are formed close to the side or corner regions of the resting surface 50b. For the instant embodiment, the receiving slots 50a are arranged on opposing sides of the resting surface 50b.

Arranged over the base 50, the platform 10 includes a supporting surface 10a, a joining surface 10b, and a pair of mounting portions 10c. The object can be disposed on the supporting surface 10a, and the joining surface 10b faces oppositely of the supporting surface 10a and joins with the sensing member 15. In other words, the sensing member 15 protrudes from the platform 10 in a direction toward the mobile device 100. The mounting portions 10c are defined at the sides of the platform 10. For the instant embodiment, the mounting portions 10c connect with respective sides of the supporting surface 10a and joining surface 10b. Alternatively, the mounting portions 10c may also be arranged at the corners of the supporting surface 10a. Since there are two mounting portions 10c for the instant embodiment, thus for each of the two opposing sides of the supporting surface 10a and joining surface 10b, one mounting portion 10c is provided. In addition, the mounting portions 10c are aligned with corresponding receiving slots 50a of the base 50, so that each of the mounting portions 10c abuts correspondingly to one flexible member 40.

In addition, as illustrated in FIG. 1, each of the mounting portions 10c further includes a correcting member 20 and a spacing member 30. The number of mounting portions 10c, correcting members 20, and spacing members 30 are the same. For example in the instant embodiment, the scale assembly 1 comprises two mounting portions 10c, thus each mounting portion 10c is furnished with one correcting member 20 and one spacing member 30. That is to say for the mounting portions 10c, correcting members 20, and spacing members 30, there is a one-to-one-to-one relationship. Meanwhile for other configurations, each pair of correcting and spacing members 20 and 30 can be formed integrally in one piece.

The correcting members 20 are adjustably disposed in the mounting portions 10c, such that a separation distance d' defined between the joining surface 10b and the mobile device 100 can be adjusted. More details regarding the separation distance d' will be provided hereinafter.

To achieve the aforementioned "adjustable" effect, each of the mounting portions 10c defines an inner surface that has a threaded portion. Meanwhile, each correcting member 20 has a threaded outer surface. In other words, the correcting members 20 may be screws and the inner surface of each mounting portion 10c defines a plurality of inner threads. Thus, the threaded portion is mateable with the threaded outer surface to allow the correcting members 20 rotatably move with respect to corresponding mounting portions 10c. However, without restricting to the above configuration, other means may be adopted to adjust the positions of the correcting members 20. More details will be provided later relating to the interaction between the correcting members 20 and platform 10.

Each of the spacing members 30 has a first face 30a and an opposing second face 30b. For the instant embodiment, each correcting member 20 has one end abutting to the first face 30a of the corresponding spacing member 30, while the corresponding flexible member 40 has one end abutting the second face 30b. In other configurations, if each set of correcting and spacing members 20 and 30 is formed in one-piece, one end of the flexible member 40 then abuts an surface of the spacing member 30 opposite to the correcting member 20.

It should be noted that for other configurations, the mounting portions 10c may directly abut the flexible members 40, without the use of correcting and spacing members 20 and 30. For example, the correcting and spacing members 20 and 30 are intended to make the scale assembly 1 compatible to different types of mobile device, by configuring the default setting and position of the platform 10. However, if the scale assembly is specifically for a particular type of mobile device, then no additional adjustments are necessary. In such cases, the correcting and spacing members 20 and 30 can be neglected.

Based on the above structural description, it can be seen that when in use, the correcting members 20, spacing members 30, and flexible members 40 of the scale assembly 1 are arranged in an up-down configuration. The flexible members 40 may be springs, where the spring force F and the change in length x of the spring are linearly related to each other. In other words, the flexible members 40 conform to Hooke's Law as follows:

$$F=kx$$

In the above equation, the constant value k represents the spring coefficient. In other words, according to the weighing range, the scale assembly 1 of the instant disclosure may utilize flexible members 40 having appropriate spring coefficient, in order to carry out the weighing process. For example, the stiffer the spring is (i.e., higher k value), the heavier can be the object. Also, in comparing to just one flexible member 40, if multiple flexible members 40 (i.e., multiple correcting and spacing members 20 and 30), are available, heavier objects may be weighed with more accurate value.

It should be pointed out as mentioned earlier, the mounting portions 10c, correcting members 20, and spacing members 30 have a one-to-one-to-one relationship, while the receiving slots 50a and flexible members 40 also have a one-to-one relationship, with the number of mounting portions 10c and receiving slots 50a being the same, thus the number of the mounting portions 10c, correcting members 20, spacing members 30, flexible members 40, and receiving slots 50a are the same.

Based on the above quantity matching characteristic, the positions of various elements are explained herein. In one configuration, when the scale assembly 1 includes one or more mounting portion 10c, the mounting portion(s) 10c may all be arranged at the same side of the supporting surface 10a. Correspondingly, the receiving slots 50a with equal quantity are also formed at the same side of the resting surface 50b, with the locations of the receiving slots 50a corresponding to that of the mounting portions 10c.

For the instant embodiment, the two mounting portions 10c are each arranged on different sides of the platform 10. In other configurations, if there are more than two mounting portions 10c, at least one of these may be arranged on one side of the supporting surface 10a, with the rest arranged on different sides thereof. Likewise, for the receiving slots 50a having the same number as the mounting portions 10c, at least one of the receiving slots 50a may be arranged on one side of the resting surface 50b and aligns with the corresponding mounting portion 10c. The rest of the receiving slots 50a are arranged on different sides of the resting surface 50b and align with corresponding mounting portions 10c. For the above mentioned mounting portions 10c, corresponding correcting and spacing members 20 and 30 are arranged therein, while the receiving slots 50a accommodate corresponding flexible members 40. For the instant embodiment, the flexible members 40 may be disposed directly underneath the corresponding correcting and spacing members 20 and 30. In addition, each of the two flexible members 40 may be oppositely disposed to carry the load evenly. In other words, the platform 10 is suspended over the base 50 via the flexible members 40. The distance between the two is represented by a suspension distance d, as shown in FIG. 1. It should be noted that relative to the separation distance d', the separation distance d' is greater than the suspension distance d, that is to say d'>d. The resting surface 50b is used for holding the mobile device 100.

The following description relates to the sensing member 15. For the instant embodiment, the surface of the sensing member 15 contacting the touch screen of the mobile device 100 increases or decreases for various weighing conditions. More specifically, based on the type of the mobile device 100, the mobile device 100 can detect the change in contact surface area and/or contact force. Hence, based on the capacitive, force-sensing, and hybrid (capacitive and force-sensing), types of the mobile device 100, a discussion of different configurations of the sensing member 15 is provided hereinbelow.

Figure 2A:
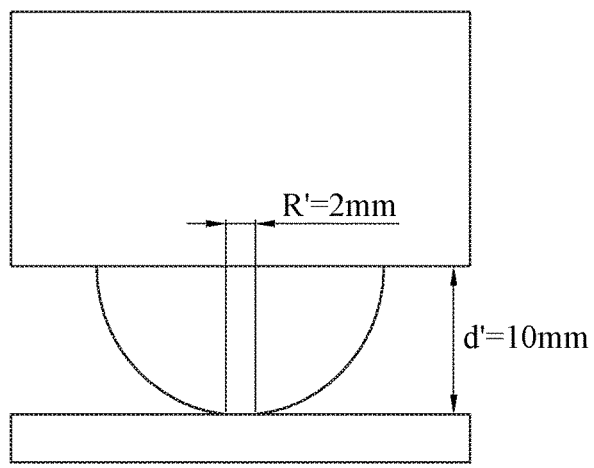
FIGS. 2A~2C show schematic views of a sensing member during the weighing process for the first embodiment of the instant disclosure.
Figure 2B:
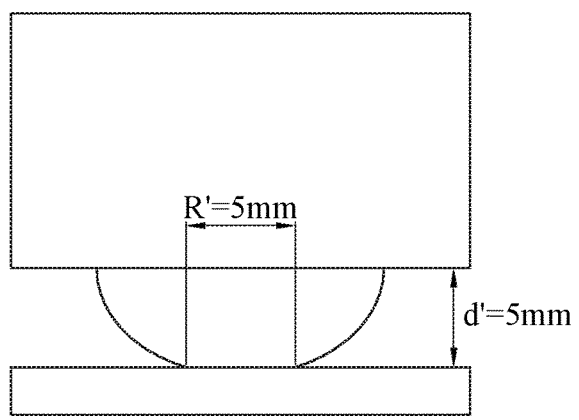
Figure 2C:
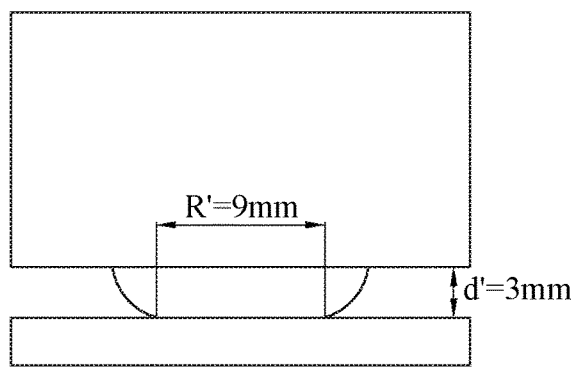
Figure 3A:
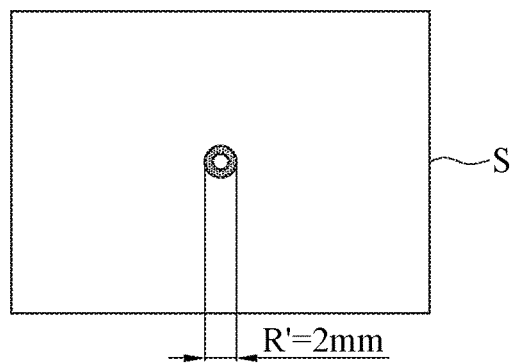
FIGS. 3A~3C show the sensing values detected by a mobile device during the weighing process for the first embodiment of the instant disclosure.
Figure 3B:
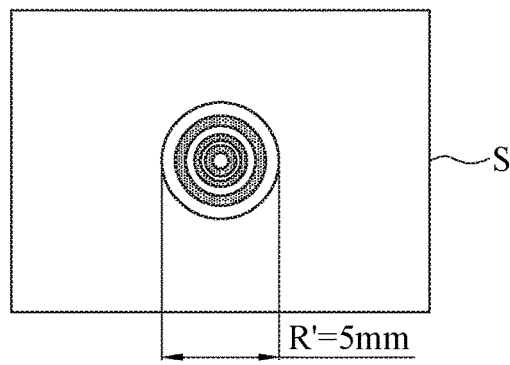
Figure 3C:
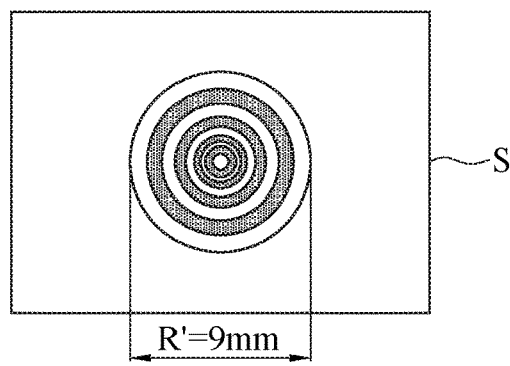

For a capacitive type touch screen, the sensing member 15 may be hemispherically shaped and made of stylus-quality materials, but is not restricted thereto. When weighing an object, the object presses onto the platform 10 and causes the sensing member 15 to press against the touch screen. The press against motion also leads the sensing member 15 to undergo a deformation, which increases the contact area of the sensing member 15 to the touch screen. In other words, the separation distance d' decreases while the diameter R' of the contact area increases, as shown in FIGS. 2A~2C and by a touch screen S in FIGS. 3A~3C. Based on the generated contact area, the change in the sensing value detected by the touch screen is utilized by the app of the mobile device 100, which provides a corresponding weight value to the user.

Figure 4A:
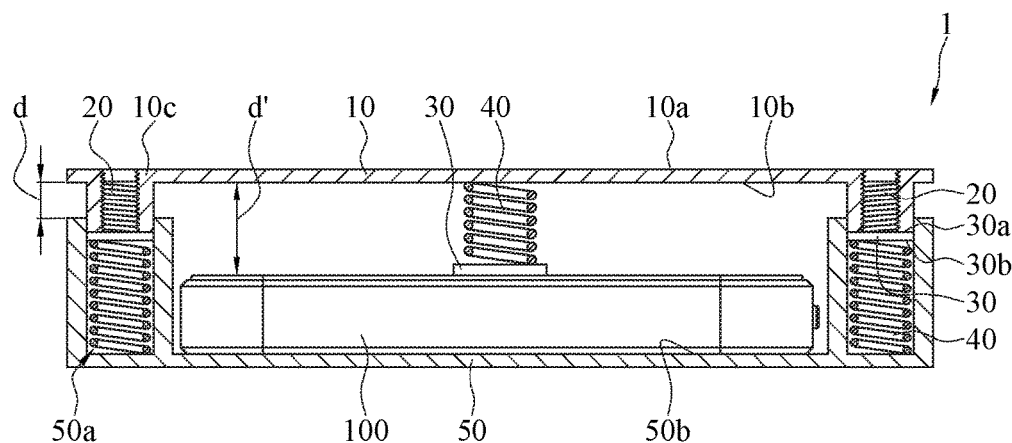
FIG. 4A is a sectional view showing a scale assembly for a second embodiment of the instant disclosure.
Figure 4B:
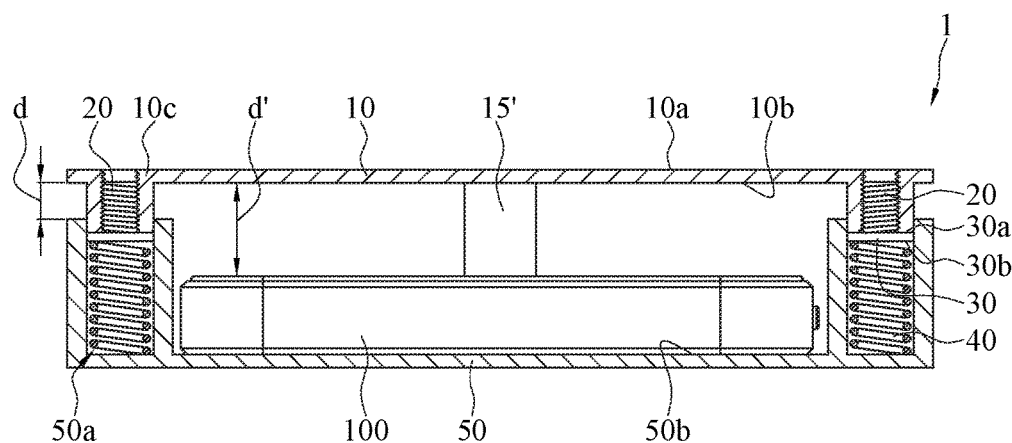
FIG. 4B is a sectional view showing a scale assembly for a third embodiment of the instant disclosure.

For other configurations in which the touch screen is of the force-sensing type, the sensing member 15 may be cylindrical or rectangular shaped. When weighing an object, the object exerts a force onto the sensing member 15, causing the sensing member 15 to press downward against the touch screen. According to a sensing value based on the change in the applied force, the mobile device 100 converts this sensing value into a corresponding weight value. For a second embodiment, as shown in FIG. 4A, the sensing member 15 may be replaced by the flexible and spacing members 40 and 30, where the flexible member 40 is a spring. When the flexible member 40 is compressed, it generates a restoring force upon the spacing member 30, in making the spacing member 30 to press against the touch screen and generates an applied force. Further still, for a third embodiment as shown in FIG. 4B, the sensing member 15 of the scale assembly 1 is replaced by a cylindrical sensing member 15'. When the platform 10 is under a load and presses downward, the cylindrical sensing member 15' also presses downward against the touch screen in generating an applied force thereon. However, the instant disclosure is not restricted thereto, any materials that satisfy the Hooke's Law may be used for the sensing member 15.

For a hybrid capacitive/force-sensing type touch screen, the mobile device 100 is capable of obtaining both the contact surface area and the force value, in order to determine the corresponding weight value. In addition, by using different number of sensing members and/or its materials, the weighing accuracy can be enhanced. For example, if the scale assembly 1 includes multiple sensing members 15, the weighing accuracy can be raised. In one configuration, the scale assembly 1 includes four sensing members 15 arranged symmetrically. Meanwhile, for other elements such as the platform 10, spacing member 30, and base 50 can be made of plastic material.

Figure 5:
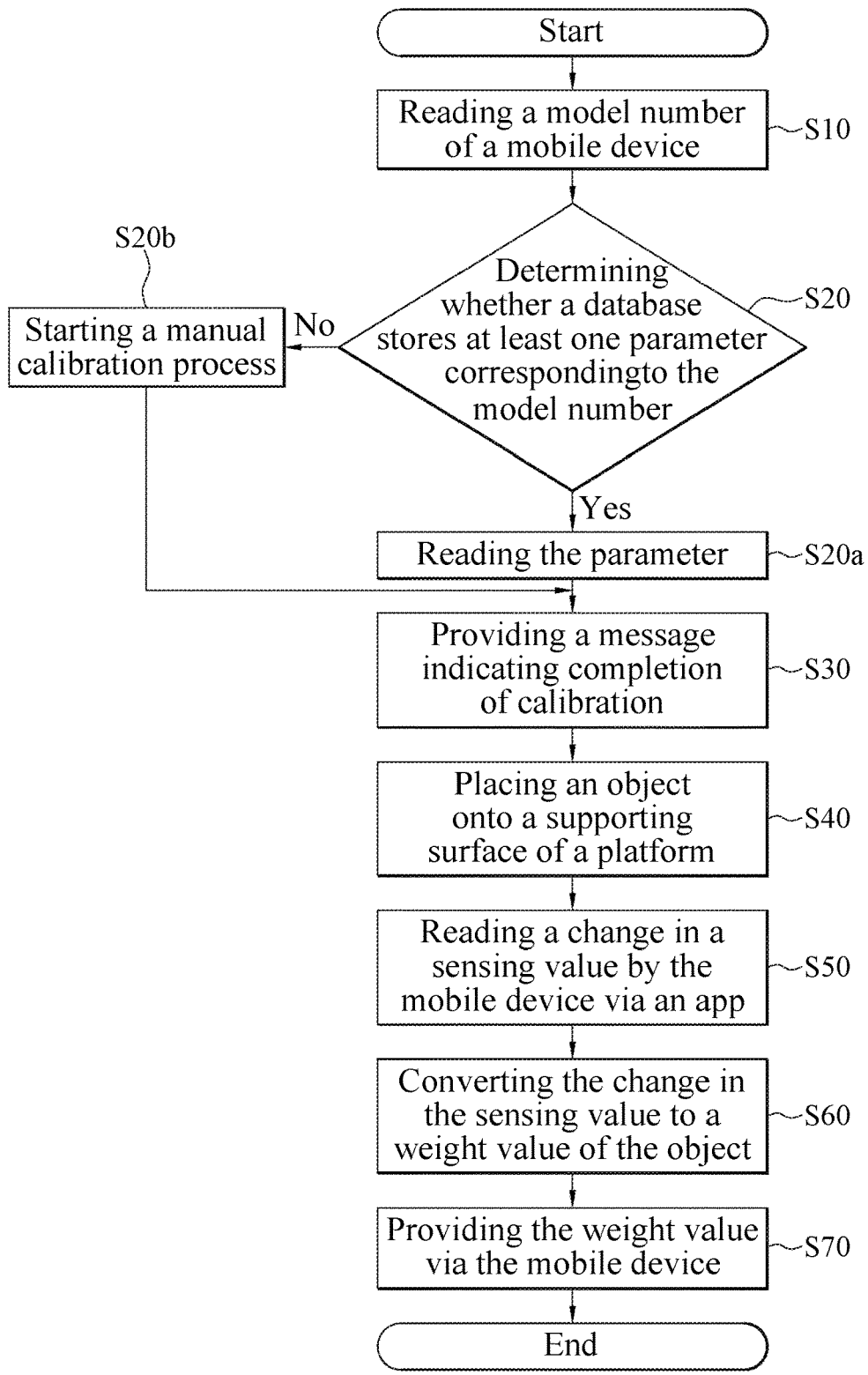
FIG. 5 is a flowchart showing the weighing process of the scale assembly for the first embodiment of the instant disclosure.

Next, please refer to FIG. 5. The description provided hereinbelow describes the weighing process of the scale assembly 1 for the first embodiment of the instant disclosure. As mentioned earlier, the mobile device 100 can be pre-installed with an app or download such program via wireless communication, in order to calculate the weight of an object. First, the user may operate the mobile device 100 to execute this app. During the execution, the app reads the model number of the mobile device 100 (step S10). Then, the mobile device 100 is signally connected to a remote database via wireless communication, before determining whether the database stores at least one parameter corresponding to the model number (step S20). If yes, the mobile device 100 reads such parameter via the app (step S20a), and follows by providing a message indicating completion of calibration (step S30). For step S30, the message provided by the mobile device 100 can be in the form of an image (e.g., via part of the touch screen), and/or voice-based (e.g., by a speaker), but is not restricted thereto.

Figure 5A:
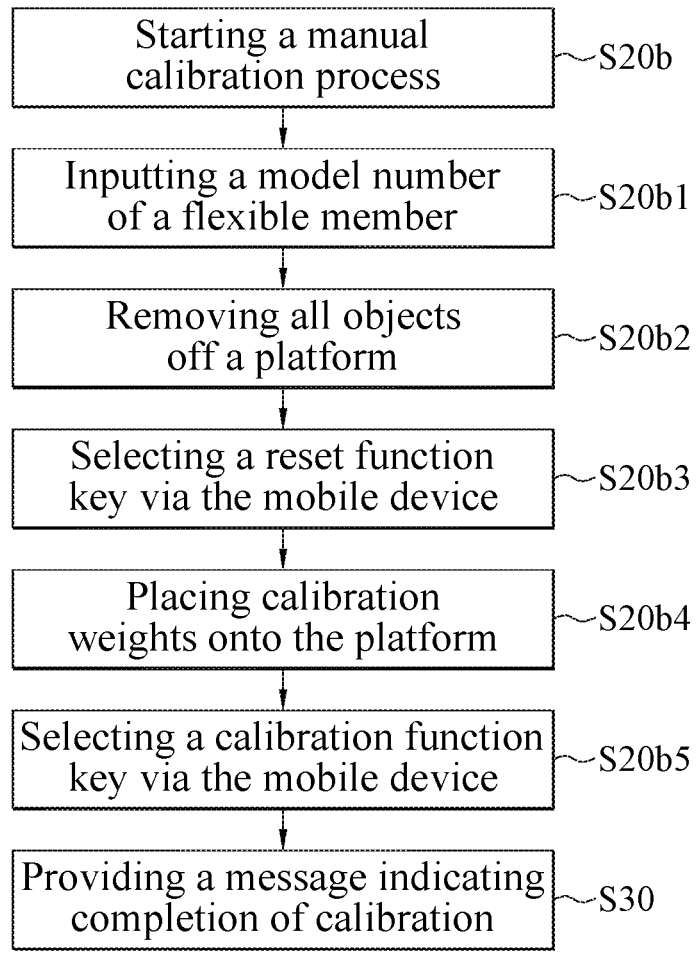
FIG. 5A is a partial flowchart showing the weighing process of the scale assembly for the first embodiment of the instant disclosure.

However, when the database does not have any corresponding parameter, a manual calibration process is initiated by the user (step S20b), as indicated in FIG. 5A. The manual calibration process is implemented by first referring to a user manual, so that a model number of the flexible member 40 can be inputted into the mobile device 100 (step S20b1). Next, the user removes all objects off the platform 10 (step S20b2). Then, the user selects a reset function key via the mobile device 100 (step S20b3). Afterwards, the user puts the calibration weights (available with the scale assembly) onto the platform 10 (step S20b4), and follows by selecting the calibration function key via the mobile device 100 (step S20b5). After completing the above steps, the mobile device 100 provides the message indicating completion of calibration (step S30). Similarly, for steps S20b3 and S20b5, the selection of reset and calibration function keys can be in the form of images (via the touch screen), keys (physical keys of the mobile device 100), voice messages, or any combination of the above, etc.

Then, the user places the object onto the supporting surface 10a of the platform 10 (step S40). Next, via the app, the mobile device 100 reads the change detected by the touch screen with regard to the sensing value (step S50), where the change herein refers to the change in contact area and/or force value of the touch screen due to the sensing member 15. The change in the sensing value is then converted to the weight value of the weighted object (step S60) by the app. Lastly, the mobile device 100 provides the weight value to the user (step S70). The mobile device 100 may utilize the touch screen to display the weight value, audio system to announce the weight value, or any combination of the above, etc.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A scale assembly, comprising: a base having a resting surface and defining at least one receiving slot, the receiving slot being defined at one side of the resting surface, the resting surface capable of placing having placed thereon a mobile device having a touch screen; at least one flexible member accommodated by the receiving slot; 4a platform having a supporting surface, a joining surface, and at least one mounting portion, the mounting portion being connected to respective sides of the supporting surface and joining surface and abutted to the flexible member; and at least one sensing member joined to the joining surface and being pressable against the touch screen of the mobile device.

2. A scale assembly, comprising: a base having a resting surface and defining at least one receiving slot, the receiving slot being defined at one side of the resting surface, the resting surface capable of having placed thereon a mobile device having a touch screen; at least one flexible member accommodated by the receiving slot; a platform having a supporting surface, a joining surface, and at least one mounting portion, the mounting portion being connected to respective sides of the supporting surface and joining surface and abutted to the flexible member; and at least one sensing member joined to the joining surface and located at a center position of the joining surface and being pressable against the touch screen of the mobile device.

3. The scale assembly of claim 2, wherein the mounting portion further includes at least one correcting member, and wherein the correcting member is adjustably received by the mounting portion and selectively abuts the flexible member.

4. A scale assembly applicable to a mobile device, the mobile device having a touch screen and a software application (app), the scale assembly comprising:

a base having a resting surface and defining at least one receiving slot, the receiving slot being defined at one side of the resting surface, the mobile device capable of being disposed on the resting surface;

at least one flexible member accommodated by the receiving slot;

a platform having a supporting surface, a joining surface, and at least one mounting portion, the supporting surface and joining surface facing opposite directions, the supporting surface capable of carrying at least one object, the mounting portion being connected to respective sides of the supporting surface and joining surface and abutted to the flexible member; and at least one sensing member joined to the joining surface and abutted to the touch screen;

wherein the mobile device utilizes the app to read a change in a sensing value, with the change in the sensing value being detected by the touch screen, and converts the change in the sensing value into a weight value of the object.

5. The scale assembly of claim 4, wherein the mounting portion further includes at least one correcting member, and wherein the correcting member is adjustably received by the mounting portion and selectively abuts the flexible member.

6. The scale assembly of claim 4, wherein the mounting portion has an inner surface, with the inner surface having a threaded portion, and wherein the correcting member has a threaded outer surface mateable to the threaded portion.

7. The scale assembly of claim 4, wherein the number of the mounting portions, flexible members, and receiving slots are the same.

8. The scale assembly of claim 7, wherein for multiple mounting portions and receiving slots, the mounting portions are formed at the same side of the supporting surface, and the receiving slots are formed at the same side of the resting surface, with the mounting portions aligning with respective receiving slots.

9. The scale assembly of claim 7, wherein for multiple mounting portions and receiving slots, the mounting portions are formed at different sides of the supporting surface, and the receiving slots are formed at different sides of the resting surface, with the mounting portions aligning with respective receiving slots.

10. The scale assembly of claim 4, wherein the sensing member is hemispherically shaped.

11. The scale assembly of claim 4, wherein the sensing member is cylindrically shaped.

* * * * *